United States Patent [19]
Cross et al.

[11] Patent Number: 4,553,408
[45] Date of Patent: Nov. 19, 1985

[54] CENTRIFUGAL HEAT PUMP

[75] Inventors: William T. Cross; Colin Ramshaw, both of Cheshire, England

[73] Assignee: Imperial Chemical Industries PLC, London, England

[21] Appl. No.: 588,105

[22] Filed: Mar. 9, 1984

[30] Foreign Application Priority Data

Mar. 22, 1983 [GB] United Kingdom ................. 8308135

[51] Int. Cl.[4] .............................................. F25B 15/00
[52] U.S. Cl. ......................................... 62/476; 62/499
[58] Field of Search ....................... 62/325, 324.3, 499, 62/476

[56] References Cited

U.S. PATENT DOCUMENTS

| | | | |
|---|---|---|---|
| 2,559,217 | 7/1951 | Kehoe | 62/325 X |
| 3,559,419 | 2/1971 | Kantor | 62/499 X |
| 3,605,436 | 9/1971 | Gammill, Jr. | 62/476 |
| 3,740,966 | 6/1973 | Pravda | 62/476 |

*Primary Examiner*—Lloyd L. King
*Attorney, Agent, or Firm*—Cushman, Darby & Cushman

[57] ABSTRACT

An absorption heat pump is described comprising at least an evaporator, an absorber, a vapor generator and a condenser and in which at least one of the components is in the form of one or more rotatable plates across the thickness of which plate(s) a heat transfer takes place. Such a heat pump can be designed in compact form.

4 Claims, 6 Drawing Figures

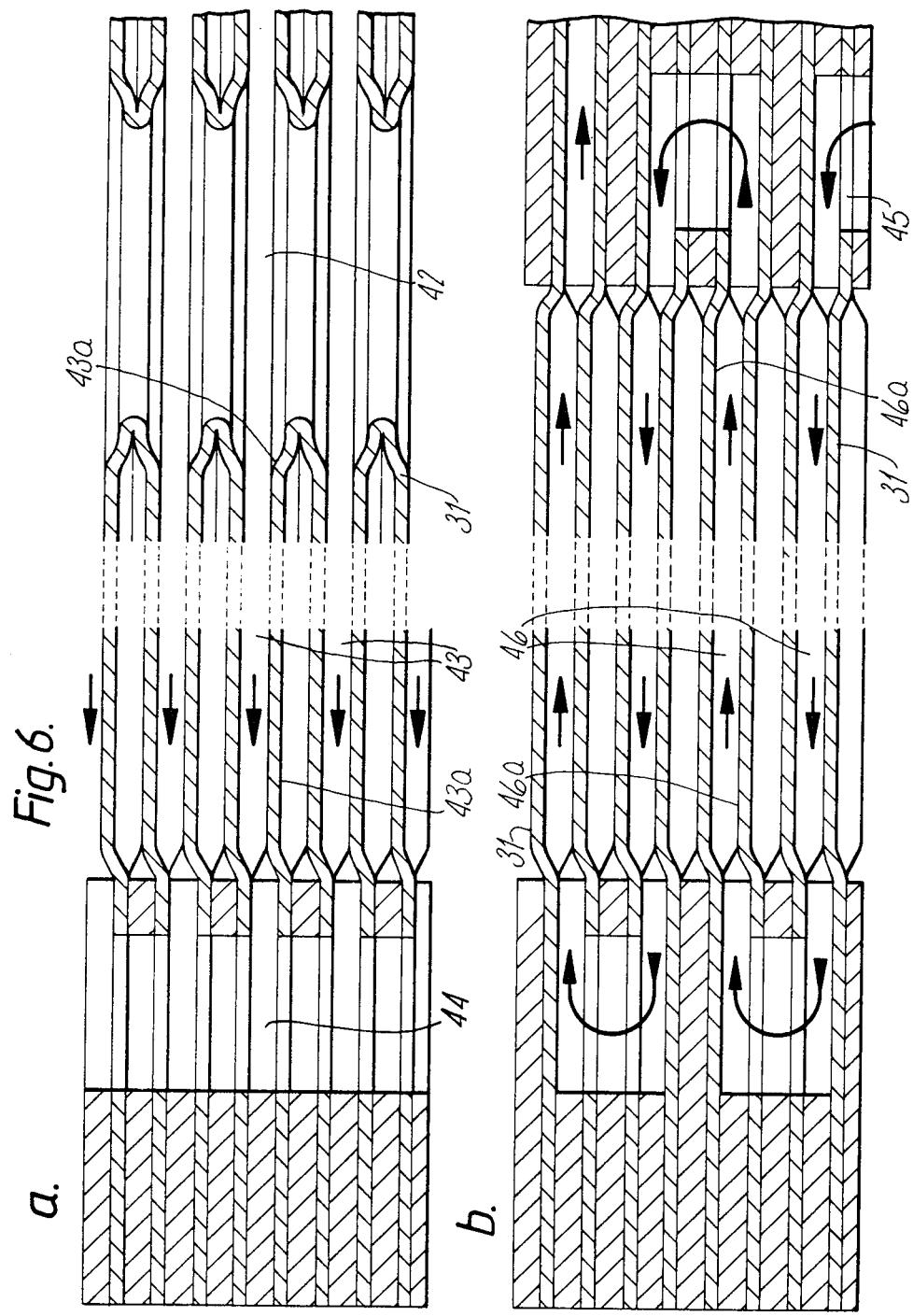

CENTRIFUGAL HEAT PUMP

This invention is concerned with heat pumps and is a new form of absorption heat pump which is of a rotary design.

Compression heat pumps have been developed within the last few decades to the point where pumps are now available suitable for industrial purposes or for the domestic heating market. Compared with more conventional forms of heating, in particular water boilers fired by oil, gas or solid fuel, they are expensive and cumbersome. However they are also more economical in operation than many other prior heating systems and there is therefore a continuing search for an improved, more compact design.

In more recent years, interest has developed in absorption heat pumps, wherein the energy input to raise the low-grade heat to higher level is provided by heating under pressure a solution containing a vaporisable working fluid, condensing at the same higher pressure the vapour thus evolved and subsequently reabsorbing the working fluid into the solvent. One of the particular problems of absorption heat pumps is the need for an efficient absorber; the absorber is often the component which contributes most to the size of the system overall. There is therefore a particular difficulty in devising a compact heat pump of the absorption type, especially one which is compact enough to be acceptable to the domestic market.

The main object of the present invention is to provide an absorption heat pump which is capable of being designed in very compact form.

According to the present invention, there is provided an absorption heat pump comprising at least an evaporator, an absorber, a vapour generator and a condenser characterised in that at least one of these aforesaid components is in the form of one or more rotatable plates, preferably in the form of a plurality of axially-spaced, parallel, rotatable plates, across the thickness of which plate(s) a heat transfer takes place.

Among the above-mentioned components of the absorption heat pump according to the present invention, it is particularly advantageous that the absorber be in said form of a plurality of rotatable plates as in this way the desired compactness of the heat pump is most readily achieved. With this in mind, we have devised a rotary absorber particularly suitable for incorporation in a rotary absorption heat pump. The present invention includes a rotary absorber devised to meet this need.

It is especially advantageous if each of the abovementioned components of the heat pump, that is evaporator, absorber, vapour generator and condenser, is in the form of one or more rotatable plates across the thickness of which heat transfer takes place. In addition, it is often desired in an absorption heat pump to carry out a heat exchange between the liquid, principally solvent, leaving the vapour generator and the solution of working fluid being fed to the vapour generator; this heat exchange also may advantageously be carried out across one or more rotatable plates.

Furthermore, in an absorption heat pump, it is necessary to provide a pumping unit to raise the pressure on the working fluid in the part of the pump which includes the vapour generator and condenser. Preferably the pumping unit is of a rotary type which can be mounted for rotation with the parallel rotatable plates.

By means of the present invention, we have made it possible to design an absorption heat pump in which every component, with the exception of the source of heat for the vapour generator, is mounted on a single shaft, in a compact design, and which is driven by a single source of rotary power.

Thus, in a particularly preferred form, a rotary absorption heat pump according to the present invention comprises:

(a) a vapour generator, mounted upon a rotary shaft for rotation therewith and comprising at least one plate across a first face of which a first fluid source of heat may flow and across the second face of which a solution of a vapourisable working fluid may flow;

(b) a condenser, mounted upon said rotary shaft for rotation therewith and comprising at least one plate to a first face of which vapourised working fluid from said vapour generator may flow and across the second face of which a medium to be heated may flow;

(c) a rotary heat exchanger, mounted upon said rotary shaft for rotation therewith and comprising at least one plate across a first face of which a depleted solution of working fluid from said vapour generator may flow and across the second face of which a stronger solution of working fluid for feeding to said vapour generator may flow;

(d) a pump, mounted about said rotary shaft and adapted to be driven thereby, designed to deliver said stronger solution of working fluid under pressure to the vapour generator;

(e) an absorber, mounted upon said rotary shaft for rotation therewith and comprising at least one plate across a first face of which said working fluid in vapour form and said depleted solution of working fluid from said rotary heat exchanger may together flow and across the second face of which said medium to be heated may flow;

(f) an evaporator, mounted upon said rotary shaft for rotation therewith and comprising at least one plate, across a first face of which an ambient fluid source of heat, may flow and across the second face of which condensed working fluid from said condenser may flow;

(g) flow restriction valves to maintain the pressure in the vapour generator and in the condenser at an elevated level; and (h) drive means to rotate said rotary shaft.

The absorber which is one aspect of the present invention comprises a plurality of parallel plates, mounted for rotation about a common axis, means to feed a condensible vapour to a first face of each of the plates, means to feed a solvent for the condensible vapour to said first face of each of the plates, means to withdraw a resulting solution of the vapour in the solvent from said first face of each of the plates, means to feed a medium to be heated to the second face of each of the plates and means to withdraw that medium from said face of each of the plates.

In a preferred form of the absorber according to the present invention which is particularly suitable for incorporation in the heat pump of the present invention, the functions of evaporator and absorber are combined in a single unit. In this combined evaporator/absorber, the steps of evaporation and subsequent absorption of the vapour produced take place on facing surfaces of two adjacent plates. Thus vapour evolved at one surface need travel only the very short distance, preferably between 0.5 and 5 mm, more preferably between 2 and 3 mm, to the facing surface of the adjacent plate before undergoing absorption. In this way, the difficult problem of designing an evaporator in which relatively large volumes of vapour have to be removed from a fast-rotating rotor, is completely avoided.

The evaporator/absorber according to the present invention comprises a plurality of pairs of plates. In subsequently referring to the "outer" face of a plate, reference is intended to that surface which faces away from the adjacent plate of a pair, similarly, by the "inner" face is meant that surface which faces the adjacent plate of a pair. In the combined evaporator/absorber, a stream of an ambient fluid source of heat, flows over the outer face of a first plate of a pair and yields up heat to the working fluid flowing over the inner face of said first plate, by heat transfer across the thickness of the plate, thereby causing the working fluid to evaporate. The resulting vapour traverses the space between the plates to the inner face of the second plate, where it encounters a flow of a solvent for the working fluid, which solvent may be in the form of a depleted solution of working fluid in solvent. Dissolution of the vapour in the solvent gives rise to the evolution of heat of solution, which is transferred across the thickness of the second plate to a central heating fluid, for example water or air, flowing across the outer face of the second plate.

A particular advantage of the absorber of the present invention is that, because the mass transfer operation of absorption and in the case of the combined evaporator/absorber the mass transfer operation of evaporation also, takes place on a rotating surface, the liquid films on the plates can be very thin. Since diffusion or thermal conduction in this (these) film(s) govern(s) the absorption and evaporation rates respectively, films which are generated on plates whereon they are subjected to a centrifulgal acceleration which is greater than the acceleration due to gravity will give rise to large heat and mass transfer coefficients. This enhancing of the heat and mass transfer rates makes it possible to design a particularly compact absorber or evaporator/absorber.

The rotating liquid pump used in the heat pump according to the present invention may conveniently be of the gear pump type but is characterised in having sun and planet gear wheels, the sun wheel being mounted about the rotating shaft of the heat pump and being held stationary by magnetic means, while the planet wheel is mounted upon an axis which rotates about the shaft with the rotor of the heat pump. However, we do not exclude the possiblity that other liquid pumping units which are known to the skilled man, e.g. a rotating cam acting on a diaphragm, may be used, providing that they can be hermetically sealed with the rotor to eliminate undue leaks of working fluid.

The plates used in the absorption heat pump according to the present invention are typically in the form of dics or annuli.

The face of the plates over which working fluid vapour flows and on which it condenses has a surface designed to discourage the formation of a continuous liquid film thereon. Preferably the face of the plates is treated such that (a) condensation of the condensible vapour thereon occurs in a dropwise fashion and (b) its wettability is reduced such that formation of any continuous, stable liquid flim is discouraged. Such treatments include provision of a coating of inter alia a suitable silicone or polytetrafluoroethylene on the surface.

The face of the plate(s) in the vapour generator and evaporator over which flows liquid working fluid and from which it is to be evaporated, may advantageously be treated so as to assist the retention of a continuous film of liquid thereon. Such treatment, which may be chemical, e.g. etching, or physical, e.g. sand-blasting, will in general be aimed at giving the surface an overall fine roughness.

The thickness of the plates employed in the heat pump according to the present invention is generally between 0.1 mm and 5 mms, depending upon the material of construction, the specific evaporation to be carried out and the form of surface features chosen. While the thickness of the plate may vary—and obviously will vary with some forms of surface features—in general when referring to plate thickness we refer to the plate thickness as it would be without those features. It will be appreciated that the thickness of the plates should be sufficient to provide the necessary ridigity under operating conditions but thin enough to permit high thermal flux from one face to another. Typically the plate thickness is between 0.25 mm and 1.25 mm.

The outer diameter of the plates used in the heat pump of the present invention is typically in the range 10 cm to 5 metres and is preferably between about 50 cm and 100 cm and where the plates are in the form of annuli the inner diameter thereof is typically in the range 5 cm to 1 metre.

Where a component of a heat pump according to the present invention comprises a plurality of plates they are mounted substantially parallel to each other along the common axis about which they are able to rotate and are closely adjacent to one another to form narrow passages. Preferably the mean axial depth of the passages between adjacent plates is between 0.5 mm and 10 mm and more preferably is between 2 mm and 3 mm.

The plates used in rotary absorption heat pumps according to the present invention are made of a suitable thermally conductive material which is able to withstand the environment to which it will be subjected during operation of the heat pump. As examples of suitable materials may be mentioned inter alia mild steel, stainless steel, coppers and aluminium.

The plates, in operation, are rotated at speed as to subject any liquid thereon to a mean acceleration, measured in a radial direction with respect to the axis of rotation, greater than the acceleration due to gravity, 'g'. The particular value selected depends upon such considerations as the size of the plates, the heat flow therethrough and the desired capacity of the heat pump in terms both of heat output and of quantity of liquid to be treated on the plates. In general, the acceleration may lie within the range from 5 to 1000 g, especially from 50 to 750 g and more preferably from 100 to 600 g.

In general, when a plate bearing liquid upon its surface is rotated, the centrifugal effect tends to move that liquid in a direction generally away form the axis of rotation. Thus the liquid to be treated on a plate in the heat pump according to the present invention is conveniently fed to the plate at a point adjacent to its axis of rotation, for example to the centre of the plate. Depleted solution of working fluid from the generator may be withdrawn from a point or points adjacent to the outer edge of the plate(s).

Typically the drive means used in the rotary heat pump according to the present invention is a belt driven by an electric motor. However, other drive means, e.g. direct drive from an electric motor, known in the rotary devices art may be used.

The first fluid source of heat which is fed to the vapour generator in the rotary heat pump according to the present invention is a hot gas a temperature of at least 1000° C. The hot gas is preferably a gaseous combustion product, more preferably a gaseous combustion product of a gaseous hydrocarbon, e.g. methane. It is especially preferred, in order to improve the overall thermal efficiency of the heat pump, that the gas combustion temperature is as high as possible, i.e. there is no excess air present, with a flame temperature of approximately 200° C.

The ambient fluid source of heat charged to the evaporator in the rotary heat pump according to the present invention may be water, e.g. from a river or pond, or preferably air.

The medium to be heated in the rotary heat pump according to the present invention is typically a central heating medium which may be air or preferably water.

The working fluids which are suitable for use with the heat pump according to the present invention include those which are already known in the absorption heat pump field; for example the chlorofluorohydrocarbons well known as refrigerants, for example Refrigerant 124, which is monochlorotetrafluoroethane, monochlorodifluoromethane 1-chloro-2,2,2-trifluoroethane and 1,1,1,2-tetrafluoroethane. The working fluid is used in combination with a suitable solvent, which preferably is a compound of good stability and therefore able to survive without difficulty the temperature cycles which repeated use for this purpose entails. Suitable solvents include the readily-available organic solvents for these refrigerant materials, among which may particularly be mentioned tetraglyme (otherwise identified as 2, 5, 8, 11, 14-pentaoxapentadecane). The combination of working fluid and solvent should be such as to have a sufficiently high heat of solution to give the required increase in temperature to the medium to be heated at the absorber.

It is believed that the present invention may better be understood by means of a detailed description of the structure and operation of a specific embodiment and for this purpose reference is made to the accompanying drawings, in which:

FIG. 3 is a radial sectional view of a heat pump according to the present invention and FIGS. 4, 5 and 6 are enlargeds views of part of the heat pump illustrated in FIG. 3.

Figure 1:
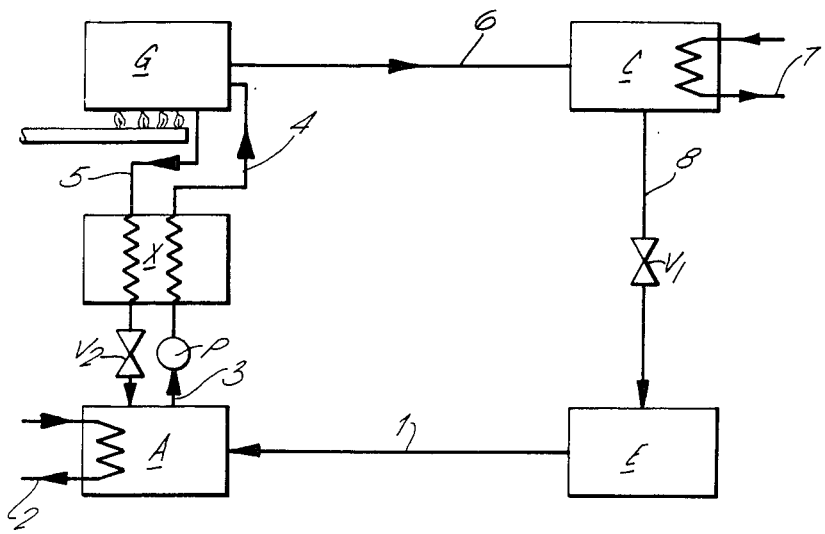
FIG. 1 illustrates in a simple schematic manner the components of an absorption heat pump.

Referring firstly to FIG. 1, a working fluid such as a chlorofluorohydrocarbon refrigerant is circulated by means of a pump P around a system consisting of an evaporator E, an absorber A, a solution heat exchanger X, a vapour generator G and a condenser C, in that sequence. In the evaporator E, the working fluid is vaporised by heat exchange with a flow of ambient air (or with some alterntive ambient source of heat, such as water or the ground). The vapour passes via line 1 to the absorber A, in which it is absorbed into a weak solution of the vapour in a solvent, yielding up its heat of solution in doing so. The heat is taken up by heat exchange into a stream of a medium to be heated, typically a central heating medium, e.g. water or air, flowing in line 2.

The solution of working fluid in solvent emerging from the absorber A (the "strong" solution), passes via the line 3 and pump P to the solution heat exchanger X, wherein it takes up heat from the depleted solution (the "weak" solution) fed to the absorber, before flowing via the line 4 to the vapour generator G. In the generator, the strong solution is heated, for example directly by gas flame or indirectly with hot gas, and working fluid vapour is evolved. The resulting weak solution is returned to the absorber A via the line 5, the solution heat exchanger X and a pressure reducing valve V2.

Vapour from the generator G is conveyed by the line 6 to the condenser C, in which it loses heat to medium to be heated flowing in line 7 and is condensed to liquid. The liquid is finally returned to the evaporator E via line 8 and an expansion valve V1.

As will be readily apparent, the total heat input to the heat pump is the sum of the low grade heat taken from the ambient fluid at the evaporator E and the high grade heat supplied to the vapour generator G. The heat output, which is at a level intermediate between that at the evaporator and that at the generator, is that taken up by the medium to be heated in the absorber A and the condenser C.

Figure 2:
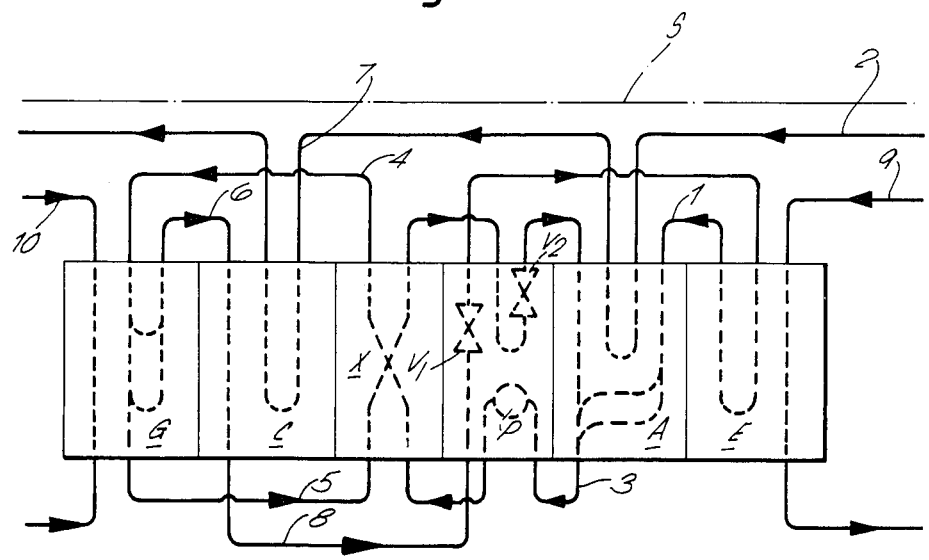
FIG. 2 illustrates the juxtaposition of those components and also the fluid flows, in an embodiment of the heat pump according to the present invention.

The embodiment of the heat pump according to the present invention illustrated schematically in FIG. 2 comprises the components of FIG. 1 mounted in the illustrated sequence upon a shaft at S, for rotation therewith. In that figure, parts corresponding to those of FIG. 1 are indicated by the use of the same numbering and lettering. As will be apparent, the sequence of flow of fluids through the heat pump is essentially the same as in FIG. 1, although the placing of the components in close juxtaposition upon a rotating shaft makes possible the assembly of a more compact unit than would be apparent from FIG. 1. The line 9 in FIG. 2 is the route by which ambient air is introduced to the evaporator. Hot gas from a suitable burner is introduced to the vapour generator by means of line 10. The medium to be heated, which flows through line 2 and then line 7, absorbs heat in the absorber and then in the condenser.

Figure 3:
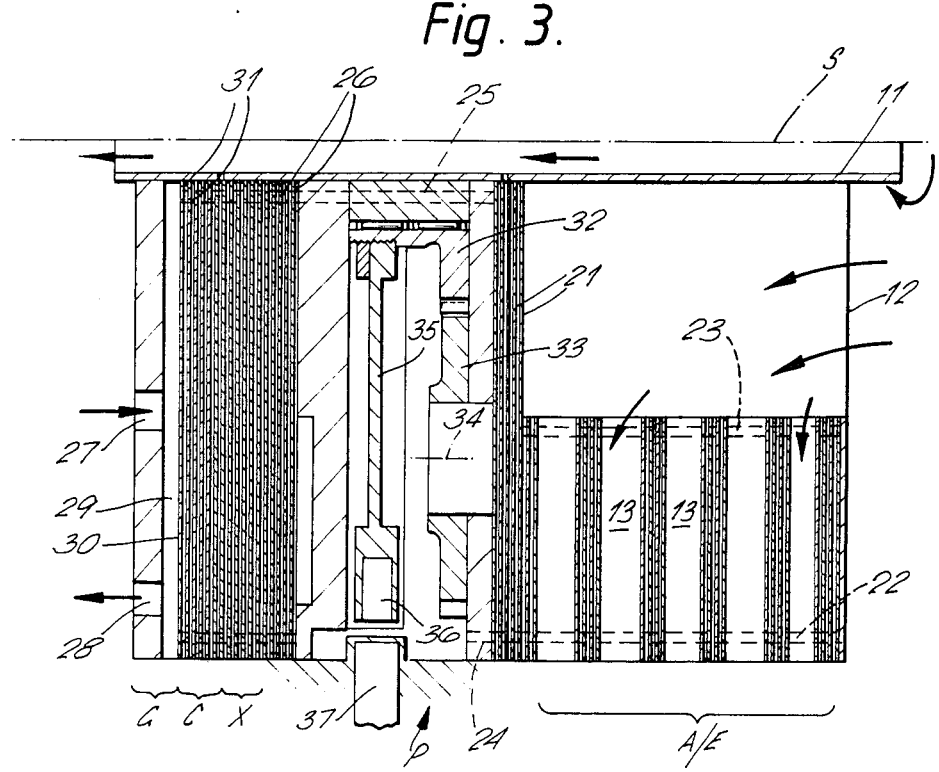

A heat pump according to the present invention is illustrated in radial section in FIG. 3, wherein the axis of rotation is again identified by the letter S. For ease of understanding, those portions of the heat pump rotor which perform functions already mentioned in connection with FIG. 2, namely the vapour generator, condenser, solution heat exchanger, pump, absorber and evaporator, are indicated by the letters G, C, X, P, A and E respectively. In fact, as described below, the functions of absorber and evaporator are combined in that part of the rotor designed A/E.

The illustrated heat pump is symmetrical about the axis S and is largely formed of a series of assorted discs and annular plates, of varying profiles. The discs and annular plates may be formed by stamping sheet metal and the heat pump may be assembled by stacking the discs and annular plates in appropriate sequence about a tubular conduit 11 which forms the axial support for the structure and which also serve to conduct central heating fluid, e.g. water, through the system.

In operation of the heat pump, it is rotated by applying the drive to conduit 11. Ambient air is drawn into the absorber/evaporator A/E via the aperture 12 and passes radially outwards through the annular air passages 13, 13, which may advantageously be fitted with fins to assist transfer of heat from the air to the adjacent annular plates. Between each pair of air passages 13, 13 is disposed an assembly of four annular plates, illustrated in greater detail in FIG. 4.

Figure 4:
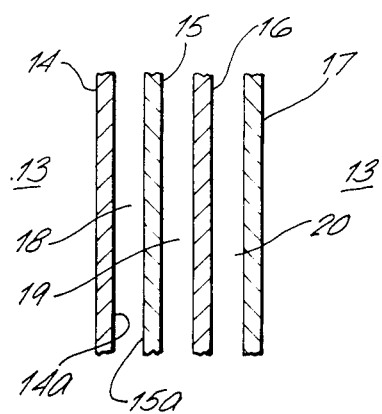
Figure 5:
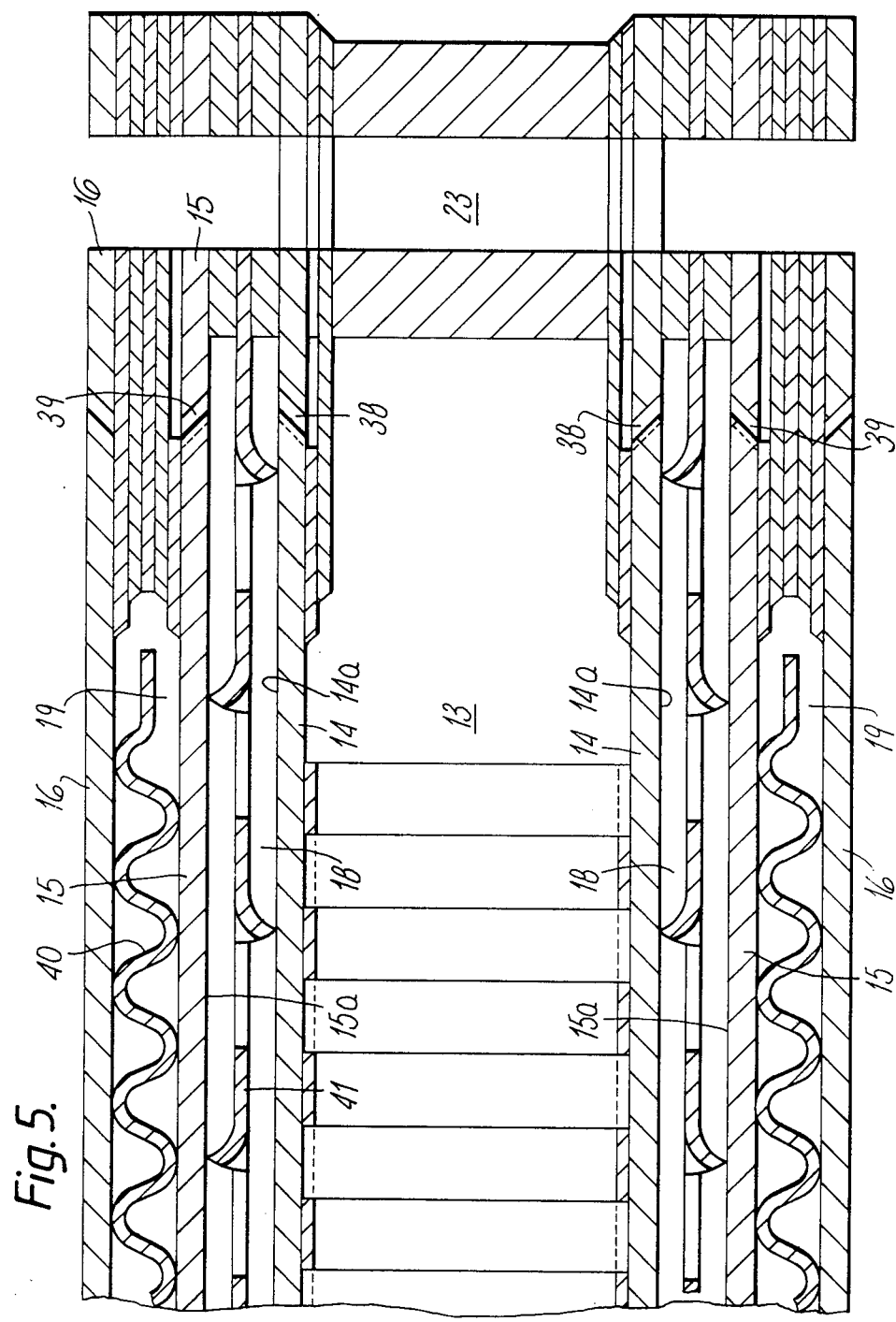

Referring now to FIGS. 4 and 5, the absorber-/evaporator, of which only parts are shown, is mounted to rotate about an axis at a short distance above FIG. 4 and to the right of FIG. 5, lying in the plane of the paper. Four plates, designated 14, 15, 16 and 17 respectively, define passages 18, 19 and 20. The evaporation and subsequent absorption of the evolved vapour take place in passageway 18 and also in passageway 20, as follows. Working fluid in the liquid state is fed to the surface 14a of plate 14 and, by absorbing the heat from the air in passageway 13, across the thickness of plate 14, is converted to vapour. Simulaneously, weak solution of working fluid in solvent is caused to flow across the surface 15a of plate 15. The vapour evolved at surface 14a passes the short distance across to adjacent surface 15a and is dissolved to form a strong solution, which is subsequently withdrawn at the outer edge of the plate 15. In dissolving, the vapour yields up its heat of solution, via plate 15, to water flowing in passage 19. A mirrorimage evaporation/absorption takes place similarly across passage 20, taking up heat from the air in the second air passage 13 and yielding heat to water in passage 19, by heat transfer across the plate 16.

Separators 40 in channel 19 and separators 41 in channel 18 give support to the overall structure of the absorber/evaporator and separators 40 also improve heat transfer. The separator plates 40 have ports therein (not shown) such that radial flow of fluid is channels 19 is not unduly inhibited. The separator plates 41 have closely spaced holes to allow passage of vapour and the edge of each hole nearest to the axis of the heat pump is provided with a lip, rather like a cheese grater, to hold the plates apart with a minimum contact area on the plates 14 and 15 in order to avoid undue transfer of heat vetween the plates and undue disturbance of the liquid films flowing on surfaces 14a and 15a.

Fluid flows, other than air, into and from the absorber/evaporator A/E are achieved via radial channels defined by discs 21, 21 and via channels 22, 23, parallel to the axis S. Adjacent channels in a circumferential sense convey different fluids.

Strong solution of working fluid from the absorber is conveyed to the pump P via a channel 24 adjacent to the outer circumference of the rotor and is delivered from the pump P to the heat exchanger X via a channel 25 adjacent to the axis S. In heat exchanger X, which consists of a plurality of parallel, axially-spaced, profiled discs 26, heat is transferred from weak solution ex the vapour generator G to strong solution, flowing on the opposite face of the plates towards the generator G.

In the generator G, hot gas from a burner (not shown) enters at 27 and flows at 29 acorss one face of a disc 30, across the other face of which strong solution flows; the gas leaves the generator via aperture 28. The face of the disc 30 adjacent to the passage 29 is preferably provided with fins. Vapour generated in the generator G passes directly to the adjacent condenser C, which comprises a plurality of parallel, axially-spaced heat to water flowing across the opposite face of the discs 31. The condensed working fluid is then conveyed back to the evporator, where the cycle begins again.

In FIG. 6, the condenser of which only a part is shown is mounted to rotate about an axis at a short distance to the right of the figure, lying in the plane of the paper; (a) is a section showing the vapour/liquid passages; and (b) is a section showing the water passages. Vapour from the vapour generator flows through a manifold 42 formed from holes in plates 31, and then through alternate channels 43 between the plates 31. In the channels the working fluid vapour contacts the surfaces 43a, liquifies and evolves heat. The liquid working fluid moves radially outward across the surfaces 43a and is discharged via manifold 44. Central heating medium enters the condenser via port 45 and then flows through alternate channels 46 between the discs 31, in the first channel 46 it flows radially outwards, in the second channel 46 it flows radially inwards. In the channels 46 the central heating medium contacts the surfaces 46a and absorbs heat which has been transmitted through the thickness of the discs 31 from the liquifying vapour.

The pump P already referred to is a gear pump having a sun gear 32, mounted free to rotate about the conduit 11, and a planet gear 33, mounted within the rotor to rotate about an axis 34, while rotating with the rotor around the axis s. The sun gear 32 is secured to a metal disc 35, which carries a number of permanent magnets 36 within its periphery. Adjacent these magnets, spaced a short distance from the rotor, are stationed a corresponding number of permanent magnets 37. The magnets 36 and 37 co-operate to hold the sun gear 32 stationary the planet gear 33 follows a rolling path around the periphery of the sun gear 32 and solution is pumped from the nip between the gears.

As will be readily seen, the adoption of a compact rotary form for each of the main components of the heat pump according to the present invention, gives rise to a resulting piece of equipment which is strikingly more compact than prior art forms of heat pump.

The present invention is further illustrated by the following example.

EXAMPLE

In an embodiment of an absorption heat pump according to the present invention as illustrated in FIG. 2 which is capable of delivering 10 kw to circulating water which enters the heat pump at 50° C. and leaves the heat pump at 65° C. at a mass flux of 0.16 kg/sec, the working fluid is a halogenated hydrocarbon which is used with a suitable solvent therefore.

It can be calculated that the conditions prevailing in the heat pump during operation are those shown in Table 1

| Line | Physical State | Mole Fraction Working Fluid | Mole Flow Rate (kmol/sec × $10^{-3}$) | Temperature (°K.) | Pressure (bars) |
| --- | --- | --- | --- | --- | --- |
| 1 | Vapour | 1.0 | 0.133 | 273.0 | 0.31 |
| 3 | Liquid | 0.253 | 1.326 | 326.0 | 0.31 |
| 4 | Liquid | 0.253 | 1.326 | 421.2 | 3.42 |
| 5 | Liquid | 0.170 | 1.194 | 431.2 | 3.42 |
| 6 | Vapour | 1.0 | 0.133 | 431.2 | 3.42 |
| 8 | Liquid | 1.0 | 0.133 | 341.0 | 3.42 |

It can be further calculated (i) that the heat absorbed (a) by the fluids in the vapour generator is 7861 W, and (b) by the working fluid in the evaporator is 2139 W, (ii) that the heat transferred to the water (a) in the absorber is 5543 W and (b) in the condenser is 4457 W; and (iii)

that the heat exchanged in the heat exchanger (assuming a heat transfer efficiency of 95%) is 43934 W.

The coefficient of performance (COP) of the heat pump, defined by the equation $$COP = \frac{\text{Total heat output of the pump}}{\text{High-grade heat input at the generator}}$$

is 1.27

We claim:

1. An absorption heat pump, comprising: a set of operatively interconnected components including an evaporator, an absorber, a vapor generator and a condenser; at least one of said components comprising at least one rotatable plate having two opposite faces separated by the thickness of such plate, and each such plate being constructed and arranged for accomplishing heat transfer across such thickness, wherein;
   (a) said vapour generator is mounted upon a rotary shaft for rotation therewith and comprises at lest one said plate constructed and arranged such that across a first said face of which a first fluid source of heat may flow and across the second said face of which a solution of a vapourisable working fluid may flow;
   (b) said condenser is mounted upon said rotary shaft for rotation therewith and comprises at least one plate constructed and arranged such that to a first face of which vapourised working fluid from said vapour generator may flow and across the second face of which a medium to be heated may flow;
   (c) said absorption heat pump further comprises a rotary heat exchanger, mounted upon said rotary shaft for rotation therewith and comprising at least one plate constructed and arranged such that across a first face of which a depleted solution of working fluid from said vapour generator may flow and across the second face of which a stronger solution of working fluid for feeding to said vapour generator may flow;
   (d) said absorption heat pump further comprises a pump, mounted about said rotary shaft and adapted to be driven thereby, said pump being constructed and arranged to deliver said stronger solution of working fluid under pressure to the vapour generator;
   (e) said absorber is mounted upon said rotary shaft for rotation therewith and comprises at least one plate constructed and arranged such that across a first face of which said working fluid in vapour from and said depleted solution of working fluid form said rotary heat exchanger may together flow and across the second face of which said medium to be heated may flow;
   (f) said evaporator is mounted upon said rotary shaft for rotation therewith and comprises at least one plate constructed and arranged such that across a first face of which an ambient fluid source of heat may flow and across the second face of which condensed working fluid from said condenser may flow;
   (g) said absorption heat pump further comprises a plurality of flow restriction valves constructed and arranged to maintain the pressure in the vapour generator and in the condenser at an elevated level; and
   (h) said absorption heat pump further comprises drive means constructed and arranged to rotate said rotary shaft.

2. An absorption heat pump as claimed in claim 1, wherein:
   at least some of said plates are so constructed and arranged that, in use, evaporation and absorption take place on respective said faces of respective pairs of two adjacent ones of said rotatable plates.

3. An evaporator/absorber, comprising: a plurality of pairs of plates, the plates in said pairs being axially-spaced, parallel and mounted for rotation about a common axis in which a stream of an ambient fluid source of heat flows over an outer face of a first place of the pair and yields up heat to working fluid flowing over an inner face of said first plate, by heat transfer across the thickness of said first plate from said outer face thereof to said inner face thereof, thereby causing the working fluid to evaporate; the plates in said pairs being so constructed and arranged that the resulting vapour traverses the space axially between the plates of such pair to an inner face of the second plate in such pair, where such vapour encounters a flow of a solvent for the working fluid, which solvent may be in the form of a depleted solution of working fluid in the solvent; the plates in said pairs being so constructed and arranged that dissolution of the vapour in the solvent gives rise to the evolution of heat of solution, which is transfered across the thickness of the second plate from said inner face thereof to an outer face thereof, to a medium to be heated flowing across said outer face of the second plate.

4. An evaporator/absorber as claimed in claim 3 wherein the depth of the said space is between 0.5 mms and 5 mms.

* * * * *